United States Patent

Schell

[15] 3,701,429
[45] Oct. 31, 1972

[54] SKIMMER FOR REMOVING FLOATING MATTER FROM A BODY OF LIQUID

[72] Inventor: Orville Carroll Schell, Rogers, Ark.
[73] Assignee: Hoyt Corporation, Rogers, Ark.
[22] Filed: Oct. 9, 1970
[21] Appl. No.: 79,607

[52] U.S. Cl. ..........................210/242, 210/DIG. 21
[51] Int. Cl. ..............................................C02b 9/02
[58] Field of Search..........210/83, 242, DIG. 21, 169

[56] References Cited

UNITED STATES PATENTS

| | | | |
|---|---|---|---|
| 2,989,185 | 6/1961 | Lombardi | 210/242 |
| 3,521,864 | 7/1970 | Welles, Jr. | 210/242 X |
| 2,891,671 | 6/1959 | Veld et al. | 210/242 |
| 3,428,178 | 2/1969 | Nash | 210/242 X |
| 3,245,539 | 4/1966 | Earle | 210/DIG. 21 |
| 1,920,371 | 8/1933 | Franke | 210/242 UX |
| 3,508,661 | 4/1970 | Diemond et al. | 210/169 |
| 3,547,553 | 12/1970 | Stanfield | 210/DIG. 21 |
| 3,534,859 | 10/1970 | Amero et al. | 210/DIG. 21 |

FOREIGN PATENTS OR APPLICATIONS 58,268   2/1937   Norway....................210/242

Primary Examiner—Reuben Friedman
Assistant Examiner—T. A. Granger
Attorney—Young & Thompson

[57] ABSTRACT

A skimmer for removing floating matter from a body of liquid, such as skimming oil spills from water, comprises a floating annular body having gently downwardly centrally inclined upper surfaces that terminate radially inwardly adjacent an annular weir. Oil is drawn over the inclined surfaces and flows over the weir and collects in a central sump. The weir is raised by an annular float disposed in the sump when the overflow in the sump is too great to be removed by a centrally positioned pump. A ballast chamber makes possible a rough adjustment of the draft of the skimmer. Peripherally spaced marginal floats disposed in upright casings that extend above and below the water line are vertically adjustable to trim the floating skimmer and to make possible a fine adjustment of the draft.

7 Claims, 3 Drawing Figures

PATENTED OCT 31 1972
3,701,429
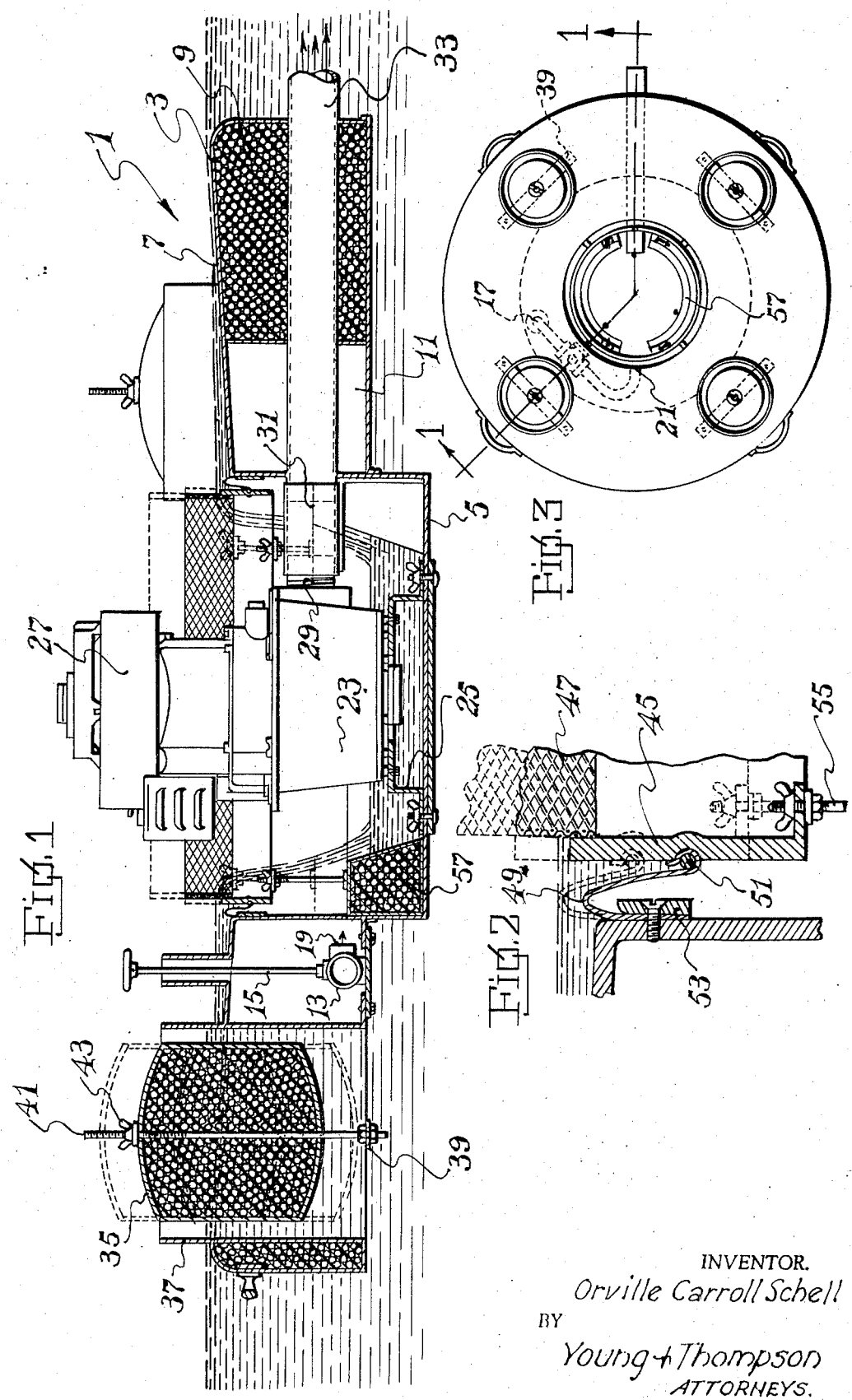
INVENTOR.
Orville Carroll Schell
BY
Young + Thompson
ATTORNEYS.

SKIMMER FOR REMOVING FLOATING MATTER FROM A BODY OF LIQUID

The present invention relates to skimmers of the type that float on the surface of a body of liquid and that remove floating matter from that surface. The invention has its field of use in connection with all bodies of liquid having floating matter thereon, particularly liquid floating matter, and has particular utility and will be hereinafter described by way of example in connection with the removal of oil floating on water. It is to be understood, however, that reference hereinafter to oil and water is made simply by way of example and is not limitative.

It is an object of the present invention to provide such a skimmer, having improved ability to draw toward itself the floating material that surrounds it.

Another object of the present invention is to provide such a skimmer, whose draft can be readily adjusted thereby to regulate the thickness of the layer of material that is skimmed.

Still another object of the present invention is the provision of such a skimmer, whose trim can be finely adjusted.

It is also an object of the present invention to provide such a skimmer which is self-regulating against overload.

Finally, it is an object of the present invention to provide such a skimmer, which will be relatively simple and inexpensive to manufacture, easy to assemble, emplace, operate, maintain and repair, and rugged and durable in use.

Other objects and advantages of the present invention will become apparent from a consideration of the following description, taken in connection with the accompanying drawing, in which:

FIG. 1 is a side cross-sectional view taken on line 1—1 of FIG. 3, of a skimmer according to the present invention floating on a body of water from which a surface layer of oil is to be skimmed;

FIG. 2 is an enlarged fragmentary view of a portion of FIG. 1, showing a portion of the structure associated with the vertically adjustable weir; and FIG. 3 is a top plan view of the structure shown in FIG. 1, but with the pump and motor removed.

Referring now to the drawing in greater detail, there is shown a skimmer according to the present invention, in the form of a buoyant body indicated generally at 1, comprising a generally flat annular hollow float 3 that surrounds a central upwardly open well 5 that extends below annular float 3. It is to be understood that the material of float 3 and well 5, as well as other parts of the device, is preferably inert to sea water and hydrocarbons and may for example be glass fiber impregnated with a thermosetting resin such as an epoxide resin, of any of the types well known to persons having ordinary skill in this field.

The upper surface 7 of float 3 is conical and is pitched radially inwardly and downwardly at a small acute angle, preferably about 4° to the horizontal, so that the summit of float 3 is a circular annulus adjacent the radially outermost portion of float 3. Surface 7 is smoothly rounded adjacent this summit so as to promote laminar flow thereover and to minimize turbulence. This summit provides the first weir over which the material to be skimmed from the surface of the water passes in a radially inward direction; and the height of this summit beneath the upper surface of the water greatly influences the flow rate. It is accordingly very important to regulate the buoyancy of the skimmer; and to this end, the float 3 is filled with plastic foam 9 of any conventional type, which may be foamed in situ but which is discontinuous at its radially inner portions so as to define a ballast chamber 11 for the reception of water thereby to adjust the draft of the skimmer. To this end, a three-way valve 13 is supported in ballast chamber 11 and may be manually controlled by a valve operator 15 from the upper side of the skimmer. An intake 17 admits water from beneath float 3; and valve 13, in one position thereof, directs this water through an opening 19 into chamber 11. In another position of valve 13, water leaves chamber 11 through opening 19 and flows by gravity to well 5 through an outlet 21.

Water from ballast chamber 11, and oil that overflows the summit of float 3, flows into well 5 and is discharged by a central intake centrifugal pump 23 with its axis vertically disposed, mounted on a support 25 and in turn supporting a superposed pump driving motor 27 which may for example be an internal combustion engine. Water and/or oil is discharged from pump 23 through its outlet 29 and passes through a flexible sleeve 31 to a discharge conduit 33 whence the pumped liquid is conveyed to the shore or to a vessel for its reception. The use of a flexible sleeve 31 permits discharge conduit 33 to be rigid.

The draft of the skimmer is thus regulated in a general way by use of the ballast chamber 11. However, fine regulation of the draft, and also the adjustment of the trim of the device, is made possible by a plurality of auxiliary floats 35 filled with rigid foamed plastic and marginally disposed in and equally peripherally spaced about annular float 3. To accommodate floats 35, float 3 has a corresponding plurality of upright cylindrical sleeves 37 therethrough that are open at both ends and at least at their upper ends extend above float 3 to prevent liquid from washing over the upper edges. At their lower ends, sleeves 37 are bridged by horizontal straps 39 secured to float 3, the straps 39 at their midpoints carrying upright rods 41 which extend through floats 35 and on which floats 35 are vertically reciprocable. Wing nuts 43 are in screw-threaded engagement with the screw-threaded upper ends of rods 41 thereby to permit selective individual adjustment of the height of each float 35 relative to the skimmer. Sleeves 37 reduce the tendency of the liquid within them to rise and fall with wave motion and hence lend a measure of stability to the skimmer.

Just as ballast chamber 11 permits coarse adjustment of the draft of the device while auxiliary floats 35 permit fine adjustment of the draft, so also the ballast chamber 11 permits coarse regulation of the quantity of skimmed liquid that reaches the well 5. However, a more sensitive adjustment of that quantity of skimmed liquid is provided by an auxiliary weir 45 in the form of a cylindrical sleeve whose axis is vertical and is coaxial with the skimmer, weir 45 being spaced radially inwardly from the upper side walls of well 5 and extending vertically above and below the radially inner edge of conical upper surface 7 of float 3. A cylindrical wire mesh screen 47 about the upper inner edge of weir 45 prevents floating objects from overflowing the upper edge of the weir and clogging pump 23.

The space between weir 45 and the upper inner edge of well 5 is closed by a flexible annular apron 49 of waterproof and oilproof material such as synthetic rubber or plastic or the like. Apron 49 is secured about its inner periphery to the outer side of weir 45 by means of a wire 51 and is secured at its outer periphery to the inner upper edge of well 5 by a band 53.

Weir 45 is supported by upright brackets 55 on a sectional annular float 57 which may for example be of rigid foamed plastic or the like. If the rate of admission to well 5 of oil from the surface of the body of water and/or water from ballast chamber 11 is greater than the rate of discharge by pump 23, then the buoyancy of float 57 with its supported weir 45 and brackets 55 will cause it to rise from the bottom of well 5 and raise the weir 45 so as to reduce or discontinue the flow of liquid over the weir. Float 57 is made sectional so that it can rise on either side of the discharge conduit.

In operation, valve 13 is actuated to admit water to ballast chamber 11 or to discharge water from ballast chamber 11 to well 5, so as to make a coarse adjustment of the draft of the skimmer. The auxiliary floats 35 are then adjusted vertically on their respective rods 41, to trim the skimmer and to make a fine adjustment of the draft, so that oil overflows the summit of conical upper surface 7 in a radially inward direction at a flow rate limited by the thickness of the floating oil layer or the capacity of the pump, whichever is less. The oil flows down the inclined surface 7 until it joins the annular lake backed up behind weir 45, and then overflows the weir 45 into well 5 whence pump 23 discharges it through conduit 33.

It is particularly to be noted that the placement of the summit of surface 7 at the radially outer portion of float 3, in combination with the gentle conical incline of surface 7, greatly increases the ability of the skimmer of the present invention to draw the surface layer, which in the illustrated embodiment is the oil layer, toward itself from regions relatively distant from the skimmer. Thus the present invention has the result of skimming the surface layer at a high flow rate, while at the same time avoiding agitation of the surface layer and avoiding intermixing of the surface layer with the subjacent liquid. In other words, oil flows at a relatively rapid velocity over surface 7, with substantially laminar flow and with a minimum of turbulence.

From a consideration of the foregoing disclosure, therefore, it will be evident that all the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. A skimmer for removing floating material from the surface of a body of liquid, comprising an annular float adapted to float on the surface of said body of liquid, an upper surface of said float that declines from the periphery of said float to a well centrally located within said float, upright sleeves extending above said surface and peripherally spaced around said float and open at both ends, auxiliary floats within said sleeves and means for selectively individually adjusting said auxiliary floats vertically relative to said float, a pump in said well for evacuating skimmed material from the skimmer, power means for driving the pump, and conduit means for conveying skimmed material from the pump to a location remote from the skimmer.

2. A skimmer as claimed in claim 1, and an annular weir disposed in said well adjacent the inner edge of said upper surface on said float for regulating the flow of material into said well.

3. A skimmer as claimed in claim 2, and means mounting said weir for vertical movement relative to said upper surface of said float.

4. A skimmer as claimed in claim 3, and annular flexible means sealing between said weir and said upper surface of said float.

5. A skimmer as claimed in claim 3, and a float in said well connected to said weir for raising said weir when an excessive amount of liquid occupies said well.

6. A skimmer as claimed in claim 5, said weir float being annular and being disposed adjacent the outer periphery of said well.

7. A skimmer as claimed in claim 1, said float having a ballast chamber, and valve means for selectively admitting water from outside said skimmer into said ballast chamber or for directing water from said ballast chamber into said well.

* * * * *